(12) United States Patent
Lundstedt et al.

(10) Patent No.: US 9,510,227 B2
(45) Date of Patent: Nov. 29, 2016

(54) COMMUNICATIONS TERMINAL WITH LINEAR OPERATING POINT DETERMINATION

(71) Applicant: Hughes Network Systems, LLC, Germantown, MD (US)

(72) Inventors: Jack Lundstedt, Monrovia, MD (US); Doug Ricker, Frederick, MD (US); John Schmid, Darnestown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 39 days.

(21) Appl. No.: 14/587,174

(22) Filed: Dec. 31, 2014

(65) Prior Publication Data

US 2016/0192226 A1    Jun. 30, 2016

(51) Int. Cl.
  *H04W 24/10*   (2009.01)
  *H04W 52/04*   (2009.01)
  *H04B 7/185*   (2006.01)
  *H04W 88/02*   (2009.01)
  *H04W 88/16*   (2009.01)

(52) U.S. Cl.
  CPC ............. *H04W 24/10* (2013.01); *H04B 7/185* (2013.01); *H04W 52/04* (2013.01); *H04W 88/02* (2013.01); *H04W 88/16* (2013.01)

(58) Field of Classification Search
  CPC ................... H04B 2203/5495; H04W 52/283; H04W 52/367
  See application file for complete search history.

(56) References Cited

U.S. PATENT DOCUMENTS

| | | | |
|---|---|---|---|
| 2005/0101340 A1* | 5/2005 | Archiable | H04W 52/367 455/522 |
| 2015/0222371 A1* | 8/2015 | Afkhami | H04B 17/0022 455/67.13 |

* cited by examiner

*Primary Examiner* — Nam Huynh
(74) *Attorney, Agent, or Firm* — Bejin Bieneman PLC (57) ABSTRACT

It is determined, e.g., in a communications terminal, that a test triggering event has occurred. A test is initiated based on the determination that the test triggering event has occurred. One or more transmissions are transmitted at one or more respective specified power levels. Measurement data is received from a remote measurement unit indicating respective received power levels of the one or more transmissions by the remote measurement unit. Based on the measurement data, a maximum transmit power level is determined.

20 Claims, 4 Drawing Sheets

COMMUNICATIONS TERMINAL WITH LINEAR OPERATING POINT DETERMINATION

BACKGROUND

The linear operating point of a transmitter used for satellite communications is typically determined by computing losses through an RF uplink path from a communications terminal transmitter to a gateway, and establishing an imprecise operating point through modulator level adjustment. The operating point is imprecise in that many factors are not easily measured at the communications terminal, e.g., due to radio gain variation, modulator gain variations, and imprecise measurement of the losses through the carrier chain. This imprecision in measuring an operating point usually results in either the transmitter being overdriven (which can cause interference and degraded performance) or underdriven, leaving unused link margin.

DETAILED DESCRIPTION

Overview

Figure 1:
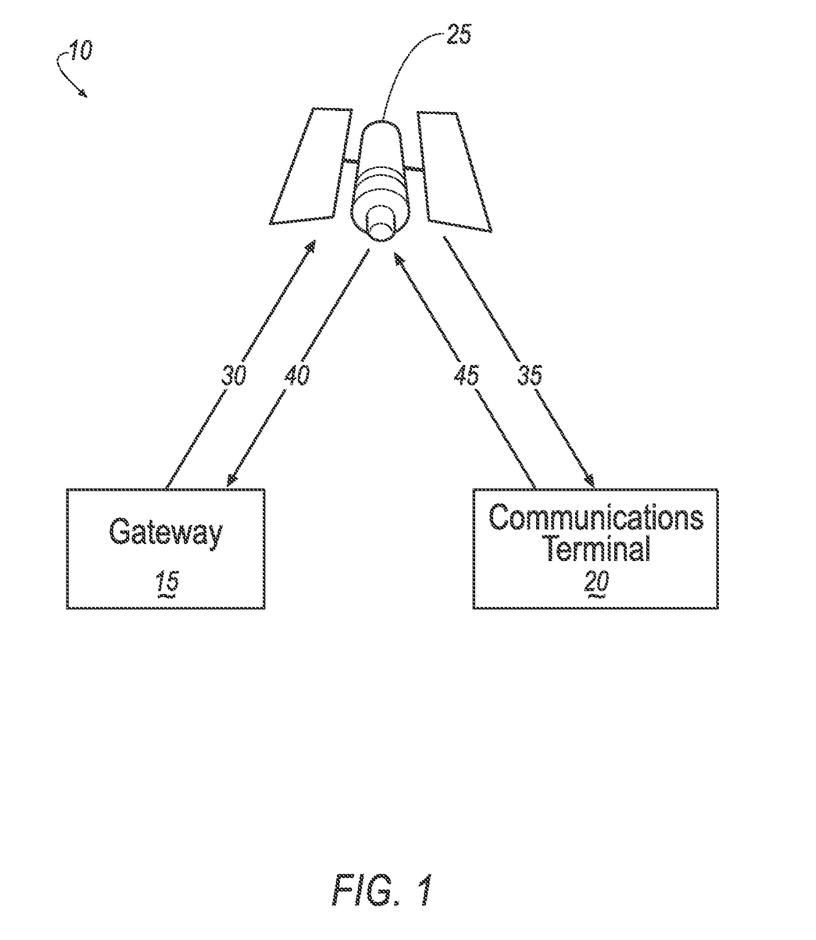
FIG. 1 is a block diagram of an exemplary system for radio frequency transmission between a gateway and a communications terminal.

FIG. 1 is a block diagram of an exemplary system 10 for radio frequency (RF) communications between a gateway 15 and one or more communications terminals 20. The RF communications are relayed by one or more communications satellites 25, sometimes, because they communicatively link various nodes such as the gateway 15 and a communications terminal 20, referred to as satellite links 25. The gateway 15 transmits outbound signals to the communications terminal 20 via the uplink 30, the satellite link 25, and the forward link 35. The communications terminal 20 transmits return signals via the return link 45, the satellite link 25 and the downlink 40.

Upon identifying a triggering event, the communications terminal 20 in cooperation with the gateway 15 executes transmission tests to determine a maximum power level (hereinafter "maximum transmit power") at which the communications terminal 20 may operate and still maintain a sufficient level of linearity.

The communications terminal 20 transmits a sequence of return signals, each at a different known power level. A measurement unit in the gateway 15 measures characteristics of each of the return signals as received at the gateway 15. The gateway 15 transmits one or more test reports to the communications terminal 20 including results of the measurements. Based at least in part on the received results, the communications terminal 20 determines the maximum transmit power.

Determining the maximum transmit power of the communications terminal 20 as disclosed herein allows the communications terminal 20 advantageously to operate at a power level close to the limit of tolerable non-linearity, based on the particular characteristics and operating conditions of the communications terminal 20. Advantageously, each of multiple communications terminals 20 can be calibrated by using a single, typically expensive, measurement unit within the gateway 15.

Exemplary System Elements

As shown in FIG. 1, the communication system 10 includes a gateway 15, one or more communications terminals 20, and one or more satellite links 25. The gateway 15 transmits outbound signals to the communications terminal 20 via an uplink 30 to a satellite link 25, which in turn transmits the outbound signals over the forward link 35 to the communications terminal 20. The communications terminal 20 transmits return transmit signals via the return link 45 to the satellite link 25, which in turns transmits, via the downlink 40, the return signals to the gateway 15.

Various types of communications may be provided over the communications system 10, e.g., Internet or other packet network access, telephone communications, Voice over IP (VoIP), audio and video transmissions, communications related to guidance systems, etc. Typically, satellite communications are conducted in the Ku band, a radio frequency band from 12 GHz to 14 GHz. Different frequencies within the Ku band are typically used for communication to the satellite link 25 and from the satellite link 25. For example, communications from the gateway 15 or the communications terminal 20 to the satellite link 25 may be conducted in the 14 GHz range, and transmissions from the satellite link 25 to the gateway 15 and the communications terminal 20 may be conducted in the 12 GHz range.

Other frequency bands may be used for satellite communications. Examples of other suitable frequency bands for use by the system 10 are the C-band from 5.85 to 6.725 GHz, and the Ka band from 29.5 to 30.0 GHz.

The satellite link 25 includes a radio frequency relay station, such as is known. As described above, communications between the gateway 15 and the satellite link 25 occur via an uplink 30 and a downlink 40. The one or more satellite links 25 receives an outbound signal from the gateway 15 via the uplink 30. The satellite link 25 relays the outbound signal via a forward link 35 to the communications terminal 20. The communications terminal 20 provides a return transmit signal to one or more satellite links 25 via a return link 45. The satellite link 25 in turn relays the return transmit signal received from the communications terminal 20 to the gateway 15 via the downlink 40. Each satellite link 25, as is known, includes a first receiver for receiving outbound signals from the gateway 15, a first transmitter for relaying the outbound signals to the communications terminal 20, a second receiver for receiving return transmit signals from the communications terminals 20, and a second transmitter for relaying the return transmit signals to the gateway 15.

In addition to relaying communications between the communications terminal 20 and gateway 15, the satellite link 25 may scale carrier frequencies of the relayed signals. For example, the satellite link 25 may receive an outbound signal from the gateway 15 with a carrier frequency in the range of 14 GHz, and relay the signal to the communications terminal 20 with a carrier frequency in the range of 12 GHz.

Figure 2:
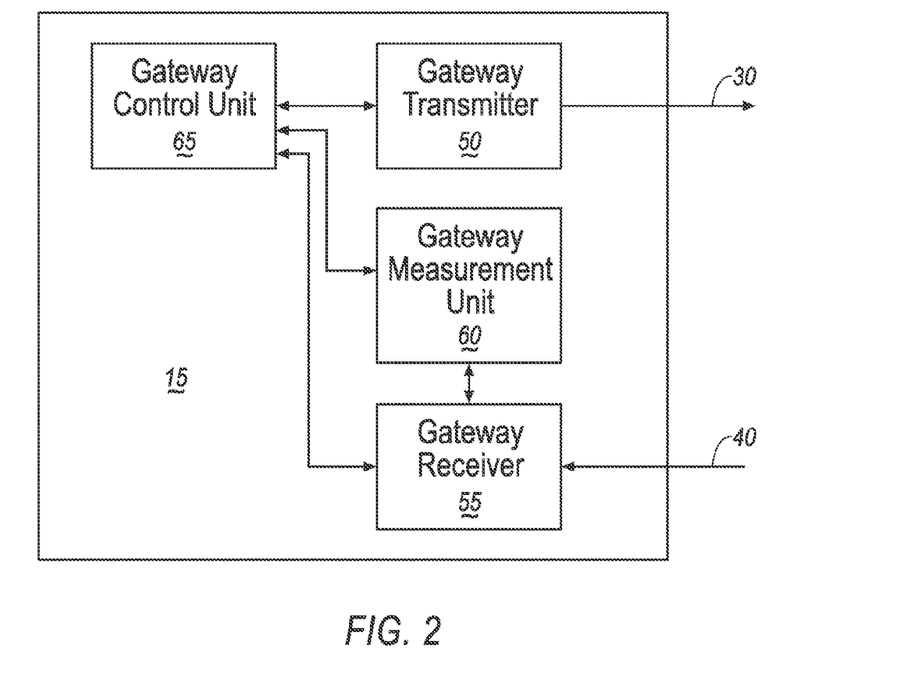
FIG. 2 is a block diagram of the gateway of FIG. 1 including a measurement unit.

The gateway 15 is typically a land based transmission system such as is known. The gateway 15 may communicate with multiple communications terminals 20 substantially simultaneously, managing large amounts of incoming and outgoing data, and generating radio frequency transmissions at power levels sufficient to reach communications satellites 25. As shown in FIG. 2, the gateway 15 includes a gateway 15 receiver 50, a gateway 15 transmitter 55, a gateway 15 measurement unit 60 and a gateway 15 control unit 65.

The gateway 15 transmitter 50 is communicatively coupled to the gateway 15 control unit 65 and is programmed to transmit outbound signals to the communications terminal 20 via the satellite link 25. The signal transmitted from the gateway 15 to the communications terminal 20, forwarded by the satellite 25, will be referred to as the outbound signal at each stage of the transmission path.

The outbound signal generated by the gateway 15 may be constructed according to known signal protocols for transmission to the communications terminal 20. Examples of such signal protocols are TDM, bursted TDM, bursted TDMA, etc. Typically, for example, signals received by the communications terminal 20 are TDM formatted signals, and return transmit signals transmitted by the communications terminal 20 are bursted TMDA formatted signals.

The outbound signals transmitted by the gateway 15 transmitter 50 may include one or more test reports. A test report includes measurement data from measurements conducted by the gateway 15 measurement unit 60, as described below.

The gateway 15 receiver 55 is communicatively coupled to the gateway 15 control unit 65 and the gateway 15 measurement unit 60. The gateway 15 receiver 55 receives return transmit signals from the gateway 15 via the satellite link 25. The gateway 15 receiver 55 extracts data from the return transmit signal and provides the extracted data to the gateway 15 control unit 15. In addition, the gateway 15 receiver 55 is programmed to provide the return transmit signal to the gateway 15 measurement unit 60 when a transmit power test is being performed.

The gateway 15 measurement unit 60 is in communication with the gateway 15 control unit 65 and the gateway 15 receiver 55, and typically includes a spectrum analyzer. As described above, the gateway 15 measurement unit 60 receives the return transmit signal from the gateway 15 receiver 55. The gateway 15 measurement unit 60 is programmed, upon receiving instructions from the gateway 15 control unit 65, to measure characteristics of the return transmit signal. For example, the gateway 15 measurement unit 60 may be programmed to measure the power level of one or more frequency components of the received return transmit signal. The gateway 15 measurement unit 60 provides the measurement data of the return transmit signal in the form of a test report to the gateway 15 control unit 65.

The gateway 15 control unit 65 includes a processor and a memory, and is communicatively coupled to each of the gateway 15 transmitter 50, the gateway 15 measurement unit 60 and the gateway 15 receiver 55. The gateway 15 control unit 65 is programmed to support, generally using the gateway 15 receiver 55, gateway 15 measurement unit 60, and gateway 15 transmitter 50, a transmit power test initiated by a communications terminal 20.

For example, the gateway 15 control unit 65, may receive a request from the communications terminal 20 to set up and participate in a transmit power test. The gateway 15 control unit 65 may confirm participation in the test and designate a test frequency channel for conducting the transmit power test and instruct the gateway 15 transmitter 50 to communicate the designated test frequency channel to the communications terminal 20. The gateway 15 control unit 65 may further instruct the gateway 15 receiver 55 to receive outbound signals in the test frequency channel and the gateway 15 transmitter 50 to transmit outbound signals in the test frequency channel.

The gateway 15 control unit 65 may yet further instruct the gateway 15 receiver 55 to provide the received return transmit signals to the gateway 15 measurement unit 60. The gateway 15 control unit 65 may then instruct the gateway 15 measurement unit 60 to provide test reports to the gateway 15 control unit 65. Upon receiving the test reports, the gateway 15 control unit 65 may provide the test reports to the gateway 15 transmitter 50 for transmission to the communications terminal 20. The gateway 15 control unit 65 may instruct the gateway 15 transmitter 50 to transmit the test reports to the communications terminal 20.

During a test, the gateway 15 may receive and process multiple return transmit signals in the manner described above. When the test is completed, the gateway 15 control unit 65, may receive an instruction to terminate the transmit power test. The gateway 15 control unit 65 may relinquish the test frequency channel. The gateway 15 control unit 65 may instruct the gateway 15 transmitter 50 to transmit an outbound signal to the communications terminal 20 indicating that the test frequency channel has been relinquished. The gateway 15 control unit 65 may further send instructions to the gateway 15 transmitter 50, gateway 15 receiver 55, and gateway 15 measurement unit 60 to terminate participation in the transmit power test.

The return transmit signals used to conduct the transmit power test may be dedicated test transmissions, including, for example, continuous tones. Additionally or alternatively, the return transmit signals used for the transmit power test may be "course-of-business" transmissions at selected power levels in order to perform a transmit power test. As referred to herein, course-of-business transmissions mean standard transmissions of data (for example video or audio data). In this manner, a transmit power test may be executed with minimal interference with communications between the communications terminal 20 and the gateway 15. Examples of transmit power tests which may be performed by the system 10 will be described in more detail below.

Figure 3:
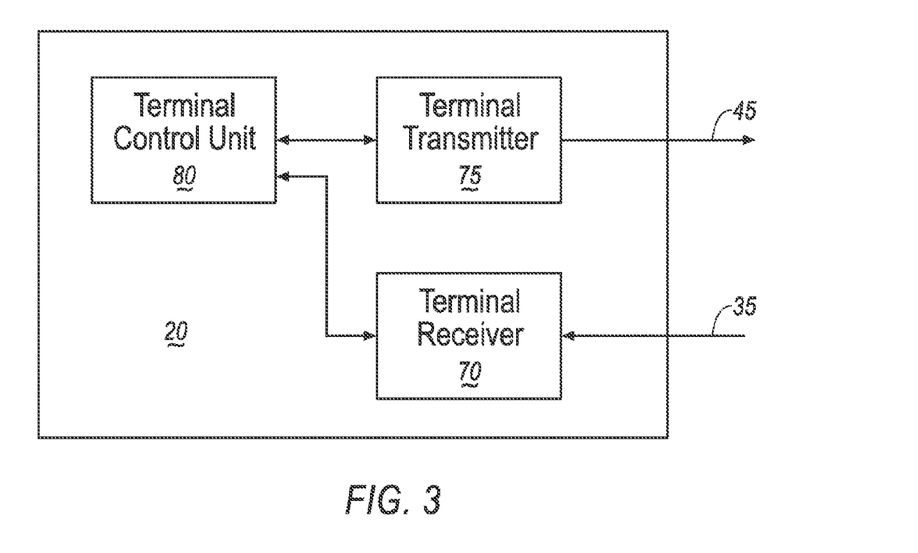
FIG. 3 is a block diagram of the communications terminal of FIG. 1.

As shown in FIG. 3, the communications terminal 20 includes a terminal receiver 70, a terminal transmitter 75 and a terminal control unit 80. As noted above, the communications terminal 20 receives outbound signals from the gateway 15 via the satellite link 25, and transmits return transmit signals to the gateway 15 via the satellite link 25. In addition, the communications terminal 20 is programmed to detect a triggering event, and initiate and execute transmit power tests, in cooperation with the gateway 15.

The terminal receiver 70 is communicatively coupled to the terminal control unit 80 and is programmable to receive the outbound signal from the gateway 15, via the satellite link 25, as described above. The terminal receiver 70 extracts data from the outbound signal and provides the data the terminal control unit 80. The data may include the test report from a transmit power test.

The terminal transmitter 75 is communicatively coupled to the terminal control unit 80, and is programmable to transmit return transmit signals to the gateway 15. The output power level of the terminal transmitter 75 is programmable. The terminal transmitter 75 may receive instructions from the terminal control unit 80 to transmit an outbound signal at a power level selected by the terminal control unit 80. The terminal transmitter 75 may instruct an RF electronics within the terminal transmitter 75 to transmit an outbound signal at the selected power level as part of a transmit power test.

Further, the terminal transmitter 75 may be programmable to transmit return transmit signals including dedicated test signals, for example, continuous tones, as part of a transmit power test.

The terminal control unit 80 includes a processor and a memory. As described above, the terminal control unit 80 is communicatively coupled to the terminal receiver 70 and the terminal transmitter 75. The terminal control unit 80 is programmed to detect triggering events for a transmit power test, and to initiate and execute a transmit power test via the terminal receiver 70 and the terminal transmitter 75. The terminal control unit 80 is further programmed to instruct the gateway 15 to set up and participate in the transmit power test.

For example, the terminal control unit 80 may be programmed to initiate a transmit power test upon detecting that that communications terminal 20 has been activated to communicate with the gateway 15. As another example, the terminal control unit 80 may be programmed to initiate a transmit power test upon detecting that a period of time has elapsed (for example, 24 hours) since the last transmit power test. As a third example, the terminal control unit 80 may, for example, receive global positioning data, and determine that the communications terminal 20 has moved more than a specified distance (for example, 1000 miles) from a location of a previously executed transmit power test. Other events may be used as triggers for transmit power tests, for example, detecting a change in operating conditions (temperature, humidity, etc.).

When the terminal control unit 80 has detected a triggering event to initiate and execute a transmit power test, the terminal control unit 80 may first request the gateway 15 control unit 65 to set up and participate in the transmit power test. For example, as described above, the gateway 15 control unit 65 may allocate a test frequency channel, and may communicate the allocated test frequency channel to the communications terminal 20. The gateway 15 control unit 65 may further configure the gateway 15 transmitter 50, gateway 15 receiver 55, and gateway 15 measurement unit 60 for participation in the transmit power test.

Upon receiving the data identifying the test frequency band, the terminal control unit 80 may instruct the terminal transmitter 75 to transmit a first test signal at a first power level. In response, the terminal control unit 80 may receive an outbound signal from the terminal receiver 70 containing a first test report from the gateway 15. Upon receiving the test report, the terminal control unit 80 may evaluate the test report to determine if a characteristic of the received test signal at the gateway 15 is within a predetermined range. Examples of specific tests with specific predetermined ranges will be described below.

If the characteristic of the received test signal are within the predetermined range, the terminal control unit 80 may instruct the terminal transmitter 75 to transmit a second test signal at a second power level, the second power level being higher than the first power level. The terminal control unit 80, may, via the terminal receiver 70, receive a second test report. Upon receiving the second test report, the control unit 80 may evaluate the second test report to determine if the characteristic of the received test signal at the gateway 15 is still within the predetermined range. The process may continue until the communications terminal 20 receives a test report indicating that the characteristic of the received test signal is no longer within the predetermined range. Note that, although the transmit power test has been described as evaluating one characteristic of the test transmission, multiple characteristics of the test transmission may be evaluated in the described manner. Further, each characteristic may be evaluated with respect to a predetermined range different from a predetermined range or ranges of other characteristics.

Upon receiving a test report where the characteristic of the received test signal is no longer within the predetermined range, the terminal control unit 80 is generally programmed to discontinue the test. For example, the terminal control unit 80 may instruct the terminal transmitter 75 to transmit an outbound signal to the gateway 15 instructing the gateway 15 to terminate the transmit power test.

The terminal control unit 80 may be programmed, based on the results of the transmit power test, to determine a maximum transmit power. For example, in the case that the fourth test transmission was within the predetermined range and the fifth test transmission was not within the predetermined range, the terminal control unit 80 may determine that the power level of the fourth test transmission is the maximum transmit power. Alternatively, in the same scenario, the terminal control unit 80 may perform a logarithmic interpolation between the power levels of the fourth and fifth test transmissions, based on the fourth and fifth test report. Other mechanisms are possible for determining the maximum transmit power.

Two-Tone Test

Figure 4:
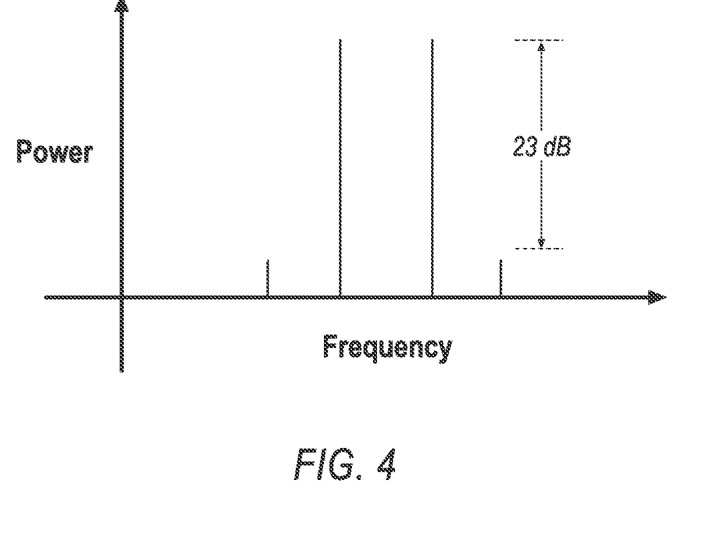
FIG. 4 is a graph of power versus frequency illustrating a two-tone measurement.

One example of a transmit power test that may be executed by the system 10 is a two-tone test. In the two-tone test, two continuous tones, i.e., signals at a fixed frequency, each with a substantially same power level as the other, are transmitted from communications terminal 20 to the gateway 15. Non-linearity in the terminal transmitter 75 result in the transmission of additional harmonic signals, referred to as intermodulation products. The dominant intermodulation products are the third order products, which occur spaced away from the original two tones by an amount $\Delta f$ in the frequency domain, wherein $\Delta f$ is the difference in frequency between the two continuous tones. The third order products are typically at a much lower power level than the power of the transmitted tones. FIG. 4 illustrates an example of a two tone transmission and the third order products.

The non-linearity of transmissions from the terminal transmitter 75 increases as the power level of the transmitted signal increases. When executing the two-tone test, the communications terminal 20 transmits a two-tone test transmission at a first power level known to be within an acceptable range of linearity. For example, the first power level may be selected to be 4 dB (four decibels) below a previously determined maximum transmit power. As another example, the first power level may be selected based on known characteristics of the communications terminal 20.

The gateway 15 receives the test transmission, and measures the transmission by the gateway 15 measurement unit 60. The gateway 15 transmits a test report to the communications terminal 20. The test report may include power levels of each of the received two tones, as well as respective power levels of the third order products. Alternatively, the test report may include the difference between the power level of the received two tones, and the third order products.

Based on the difference between the power level of the received two tones, and the third order products, the terminal control unit 80 determines if the non-linearity transmissions from the terminal transmitter 75 is within the predetermined range. Typically, for the two-tone test, the non-linearity is determined to be within the predetermined range if the difference in the power level of the received two tones and the third order products is greater than 23 dB.

The communications terminal 20 may transmit a second test transmission at a second power level higher than a first power level of the first test transmission. For example, the communications terminal 20 may increase the power level of the two tones by 1 dB, and transmit the second test transmission.

As described above, the gateway 15 may measure the received second test transmission, and provide a second test report to the communications terminal 20.

As also described above, the communications terminal 20 may determine if a difference in power level between the received two tones and the third order products is greater than 23 dB.

The test process may continue until a test transmission power level results in a difference in power level between the received two tones and the third order products that is less than the predetermined range, e.g., 23 dB. The communications terminal 20 determines, based on this result, that the power level of the current test transmission is too high. Based on this determination, the communications terminal 20 may determine a maximum transmit power as described above.

The two-tone test requires the transmission of two continuous tones, and therefore interrupts normal "course-of-business" transmissions. In the event that continuous communications are required between the communications terminal 20 and the gateway 15, a 1 dB Gain Compression Test, using selected power levels for course of business transmissions may be used.

1 dB Gain Compression Test

Figure 5:
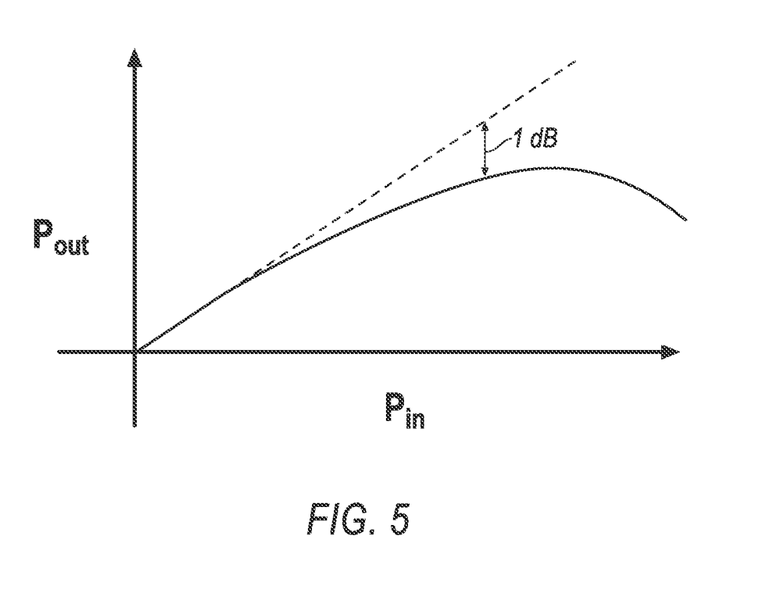
FIG. 5 is a graph of input power versus output power illustrating a $P_{in}/P_{out}$ measurement.

A second example of a transmit power test that may be conducted by the system 10 is the 1 dB Gain Compression Test, also referred to as the $P_{in}/P_{out}$ Test. In this test, test signals (which may be course-of-business-transmissions) are transmitted at selected power levels by the communications terminal 20. The power level of the outbound signal ($P_{out}$), as received at the gateway 15 is compared to a theoretical value of the received power level of the outbound signal ($P_{outcg}$) assuming constant gain of the terminal transmitter 75. A selected transmit power level $P_{in}$ is determined at which $P_{out}$ is a predetermined amount below the theoretical level $P_{outcg}$.

With reference to the graph of FIG. 5, at relatively low power levels, a gain between $P_{in}$ and $P_{out}$ is substantially constant. This is represented by the region of the graph of FIG. 5, where the dashed line (representing $P_{outcg}$) and the solid line (representing $P_{out}$) are coincident. As the selected power level of $P_{in}$ increases, the gain will begin to decrease. $P_{out}$ will begin to be lower than $P_{outcg}$. This is shown in the graph of FIG. 5 as the region where the solid line ($P_{out}$) deviates from the dashed line ($P_{outcg}$).

In the 1 dB Gain Compression Test, the selected power level $P_{in}$ of the test transmission is incrementally increased. The power level of the received outbound signal $P_{out}$ is measured by the gateway 15 measurement unit 60. The gateway 15 provides a test report to the communications terminal 20. The communications terminal 20 determines, based on the test report, if the difference between the power level of $P_{out}$ and the theoretical value $P_{outcg}$ is within a predetermined range.

Typically, if the difference in power level between $P_{out}$ and $P_{outcg}$ is less than 1 dB, the difference is determined to be within the predetermined range. A 1 dB difference between the power levels $P_{out}$ and $P_{outcg}$ corresponds approximately to a power level at which the difference between the power level of the received two tones and the third order products is 23 dB.

As described above, if a difference in power level between $P_{out}$ and $P_{outcg}$ exceeds 1 dB, the communications terminal 20 determines a maximum transmit power based on the received test reports. For example, the communications terminal 20 may determine that the power level of the last test transmission to remain within the predetermined range is the maximum transmit power. As mentioned above, other mechanisms may be used to determine the maximum transmit power.

Exemplary Process Flow

Figure 6:
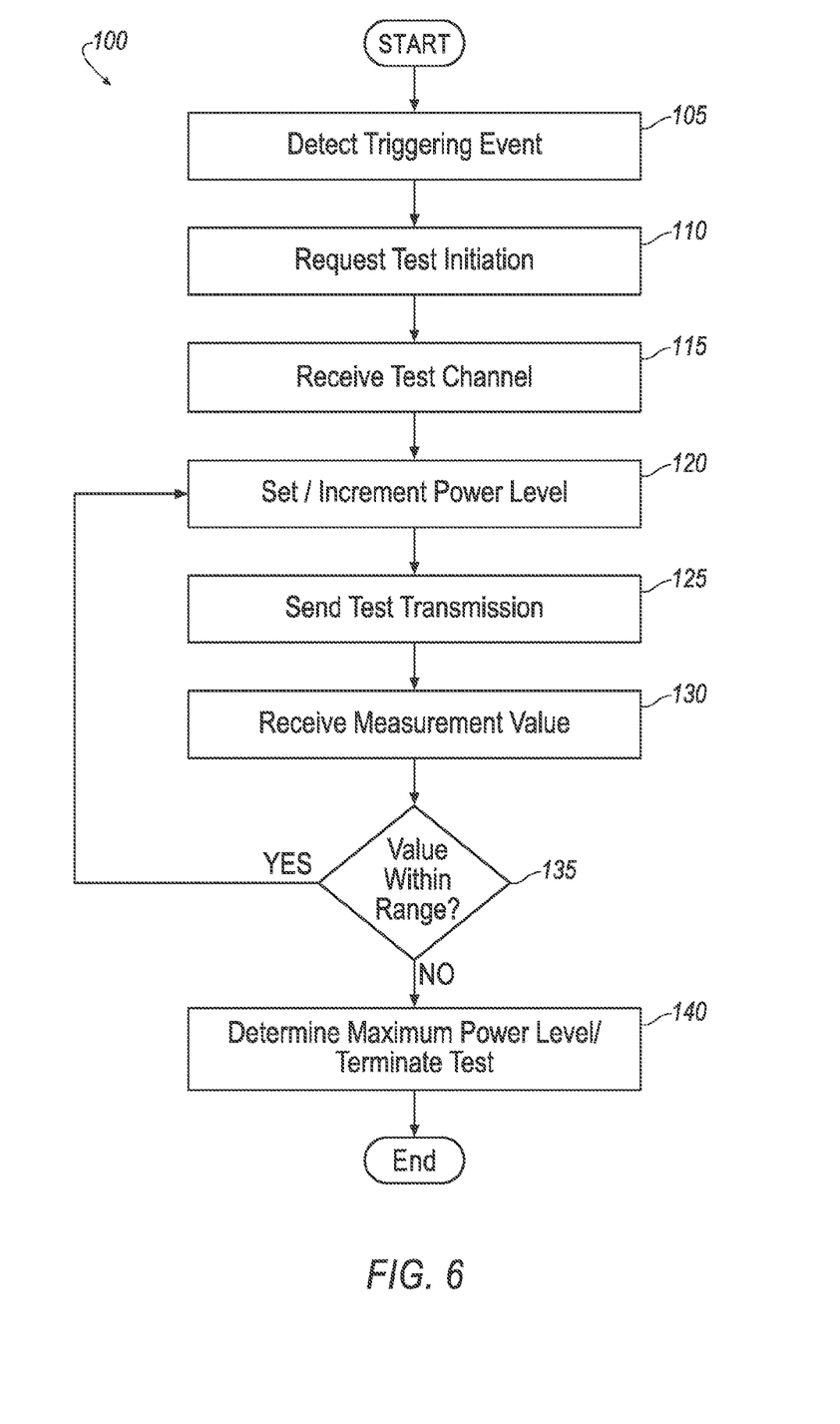
FIG. 6 is a diagram of an exemplary process for determining a maximum transmit power level for a communications terminal.

FIG. 6 is a diagram of an exemplary process 100 for determining a maximum transmit power for a terminal transmitter 20, according to the two-tone test.

The process 100 begins in a block 105, in which, as described above, a terminal control unit 80 detects that a trigger event for a transmit power test has occurred. As described above, the trigger event could be the activation of the communications terminal 20, the passage of a period of time since a previous transmit power test was performed, detection that the terminal transmitter 20 has moved more than a predetermined distance since the previous transmit power test, etc. The trigger may further be, for example, an instruction from the gateway 15 to conduct a transmit power test. Upon detecting the trigger event, the process 100 continues in a block 110.

In the block 110, the communications terminal 20 transmits a return transmit signal to the gateway 15 requesting that the gateway 15 set up and participate in a transmit power test. Based on the request, the gateway 15 allocates a test channel frequency for conducting the test. The gateway 15 programs the gateway 15 transmitter 50, gateway 15 receiver 55, and gateway 15 measurement unit 60 for conducting the transmit power test. The gateway 15 further sends a confirmation to the communications terminal 20 including the test channel frequency allocated for the test. The process then continues with a block 115.

In the block 115, the communications terminal 20 receives the confirmation that the gateway 15 has set up the transmit power test and further receives the test channel frequency allocated for the test. Based on the received confirmation and test channel frequency, the communications terminal 20 instructs the terminal transmitter 75 and terminal receiver 70 to execute the transmit power test. The process 100 then continues in a block 120.

In the block 120, the communications terminal 20 sets a first transmit power level if the transmit power test is beginning, or increments the transmit power level if a first test transmission is complete, and the transmit power test is on-going. The first transmit power level is a power level where the communications terminal 20 is known, e.g., has been empirically determined, to operate in a sufficiently linear manner. The initial transmit power level may be set at a level below the maximum transmission power, as discussed above. For example, the initial transmit power level may be set at a level 4 dB below a previously determined maximum power level. Alternatively, the initial transmit power level may be set at a level 4 dB below a typical maximum transmit power for the type of transmitter being employed. Other mechanisms or determining the initial transmit power level may be used.

In the event that the communications terminal 20 is generating a second or subsequent test transmission, the power level may be incremented by a predetermined amount, for example 1 dB from the previous transmit power level.

The communications terminal 20 then sets the terminal transmitter 75 to transmit a two-tone transmission at the determined power level over the indicated test channel frequency. The process 100 continues in a block 125.

In the block 125 the communications terminal 20 transmits a two-tone transmission at the selected power level and test channel frequency to the gateway 15. The gateway 15 receiver 55 receives the test transmission and provides the test transmission to the gateway 15 measurement unit 60. The gateway 15 measurement unit 60 measures the two-tone power level and third order products power level. The gateway 15 provides a test report to the communications terminal 20 including either the power of the two-tone signals and third order products, or the difference between the power of the two-tone signals and the power of the third order products. The process 100 continues in a block 130.

In the block 130, the communications terminal 20 receives the test report. The process 100 continues in a block 135.

In the block 135, the communications terminal 20 determines, based on the test report, if the difference in power between the received two-tone signals and the third order products is within a predetermined range. For example, the predetermined range may be defined as the difference in power level between the received two-tone signals and the third order products being greater than 23 dB. If the communications terminal 20 determines that the difference in power levels is greater than 23 dB, the process 100 continues in the block 120. If the difference in power levels is less than 23 dB, the process 100 continues in a block 140.

In the block 140, the communications terminal 20 determines and stores the maximum transmit power. For example, the maximum transmit power may be the power level of the last test transmission for which the difference in power levels between the received two-tone signals and the third order products is greater than 23 dB. Alternatively, the maximum transmit power may be interpolated from the test reports of the current and previous test transmissions. The communications terminal 20 stores the determined maximum transmit power in a memory of the terminal control unit 80. The communications terminal 20 may further send an instruction to the gateway 15 to terminate the transmit power test. The process 100 may then end.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A mobile terminal comprising a computer including a processor and a memory, the memory storing instructions such that the processor is programmed to:
   determine that a test triggering event has occurred,
   initiate a test based on the determination that the test triggering event has occurred;
   transmit, via a satellite, a first transmission at a first specified power level and one or more subsequent transmissions at one or more respective subsequent specified power levels, each of the subsequent specified power levels incrementally increased from a previous power level;
   receive measurement data from a remote measurement unit indicating a respective received power level of the first transmission and the one or more subsequent transmissions by the remote measurement unit until the measurement data is no longer within a predetermined range; and
   determine; based on the measurement data, a maximum transmit power level of the communications terminal based at least in part on the highest received power level within the predetermined range.

2. The communications terminal of claim 1, wherein the test triggering event includes an activation of the communications terminal.

3. The communications terminal of claim 1, wherein the test triggering event includes a period of time since a previous test has been performed.

4. The communications terminal of claim 1, wherein the test triggering event includes receiving a request to initiate a test from a remote terminal including the remote measurement unit.

5. The communications terminal of claim 1, wherein initiating a test includes transmitting, to a remote terminal including the measurement unit, a request to set up and participate in the test, and receiving, from the remote terminal, a confirmation.

6. The communications terminal of claim 1, wherein transmitting the one or more transmissions includes:
   determining the first power level for the first transmission, based on data associated with the communications terminal; and
   incrementing the power level of each subsequent transmission by a predetermined amount.

7. The communications terminal of claim 6, wherein the first power level is based at least in part on a previously determined maximum transmit power level.

8. The communications terminal of claim 1, wherein the transmission includes transmitting two continuous tones, separated in frequency, at substantially a same power level.

9. The communications terminal of claim 8, wherein the measurement data includes data indicating a difference between the received power level of the two continuous tones, and a received power level of a third order product of the two continuous tones.

10. The communications terminal of claim 1, wherein the transmissions of the test sequence includes course-of-business communications between the communications terminal and a remote terminal including the measurement unit.

11. The communications terminal of claim 1, wherein the maximum transmit power is determined based at least in part on at least one of the power level of a most recent transmission and the power level of a transmission immediately preceding the most recent transmission.

12. A method comprising:
    determining, by a communications terminal, that a test triggering event has occurred;
    initiating a test based on the determination that the test triggering event has occurred;
    transmitting, via a satellite, a first transmission at a first specified power level and one or more subsequent transmissions at one or more respective subsequent specified power levels, each of the subsequent specified power levels incrementally increased from a previous power level;
    receiving, from a remote terminal including a measurement unit, measurement data from the remote measurement unit indicating a respective received power level of the first transmission and the one or more subsequent transmissions by the measurement unit until the measurement data is no longer within a predetermined range; and
    determining, based on the measurement data, a maximum transmission power level for transmissions from the communications terminal based at least in part on the highest received power level within the predetermined range.

13. The method of claim 12, wherein the test triggering event includes an activation of the communications terminal.

14. The method of claim 12, wherein the test triggering event includes a period of time since a previous test has been performed.

15. The method of claim 12, wherein initiating the test includes transmitting, to a remote terminal including the measurement unit, a request to set up and participate in the test, and receiving, from the remote terminal, a confirmation.

16. The method of claim 12, further comprising:
    determining the first power level for the first transmission based on data associated with the communications terminal; and
    incrementing the power level of each subsequent transmission by a predetermined amount.

17. The method of claim 12, wherein the transmission includes transmitting two continuous tones, separated in frequency, at substantially a same power level.

18. The method of claim 17, wherein the measurement data includes data indicating a difference between a received power level of the two continuous tones, and a received power level of a third order product of the two continuous tones.

19. The method of claim 12, wherein the transmissions include course-of-business communications between the communications terminal and a remote terminal including a measurement unit.

20. The method of claim 12, wherein the maximum transmit power level is determined based at least in part on at least one of the power level of the last transmission and the power level of the immediately preceding transmission.

* * * * *